United States Patent [19]

Kropp

[11] 4,329,396
[45] May 11, 1982

[54] CORROSION-RESISTANT REFLECTIVE OR TRANSPARENT-REFLECTIVE SHEET MATERIAL

[75] Inventor: James E. Kropp, Maplewood, Minn.

[73] Assignee: Minnesota Mining and Manufacturing Company, Saint Paul, Minn.

[21] Appl. No.: 153,183

[22] Filed: May 27, 1980

[51] Int. Cl.³ .................... C09U 7/02; B32B 27/18; B32B 15/08

[52] U.S. Cl. .................... 428/354; 428/353; 428/458; 428/520; 428/523; 428/910; 428/918; 428/483; 428/461

[58] Field of Search .............. 428/343, 458, 520, 461, 428/910, 523, 918, 483, 353, 354

[56] References Cited

U.S. PATENT DOCUMENTS

| | | | |
|---|---|---|---|
| 2,774,421 | 12/1956 | Lion | 160/238 |
| 3,164,438 | 1/1965 | Thomas | 8/46 |
| 3,290,203 | 12/1966 | Antonson et al. | 428/336 |
| 3,310,575 | 3/1967 | Spivack | 260/429 |
| 3,351,558 | 11/1967 | Zimmerer | 252/137 |
| 3,488,368 | 1/1970 | Spivack | 260/429.7 |
| 3,681,179 | 8/1972 | Theissen | 428/336 |
| 3,974,323 | 8/1976 | Brouilette et al. | 428/457 |
| 4,095,013 | 6/1978 | Burger | 428/522 |

FOREIGN PATENT DOCUMENTS 2034436  1/1972  Fed. Rep. of Germany ...... 428/461

OTHER PUBLICATIONS

Ciba–Geigy, UV Stabilizer, "Irgastab" 2002, 3/20/78, pp. 2-7.

*Primary Examiner*—P. Ives
*Attorney, Agent, or Firm*—Cruzan Alexander; Donald M. Sell; Richard E. Brink

[57] ABSTRACT

The corrosion resistance of reflective or transparent-reflective sheet material comprising a vapor-deposited layer of aluminum or other corrodible metal on a polymeric foil backing is enhanced by incorporating a nickel organic ultraviolet light stabilizer in a layer which overlies the metal layer. The sheet material is especially adapted for use in energy control products, where it may be adhered to, or hung in front of, a windowpane.

9 Claims, No Drawings

CORROSION-RESISTANT REFLECTIVE OR TRANSPARENT-REFLECTIVE SHEET MATERIAL

TECHNICAL FIELD

This invention relates to reflective or transparent-reflective sheet material of the type comprising a self-supporting polymeric foil backing, a vapor-deposited layer of corrodible metal (especially aluminum) on said backing, and a protective polymeric barrier layer overlying the metal layer and bonded thereto. The invention relates especially to energy control films of the type used in connection with windows to exclude undesired solar energy.

BACKGROUND ART

For many years it has been recognized that a windowshade made of translucent or transparent material could be provided with a vapor-deposited layer of aluminum, the aluminum layer optionally being protected from mechanical abrasion by a coating of varnish or the like; see U.S. Pat. No. 2,774,421. A distinct improvement over this early shade is shown in U.S. Pat. No. 3,290,203, where a polymeric barrier layer is applied over the vapor-deposited aluminum and a water-activatable adhesive thereafter employed to bond the sheet material directly to a windowpane. U.S. Pat. No. 3,681,179 shows the use of a different type of water-activated adhesive, viz., a normally tacky and pressure-sensitive adhesive temporarily detackified by a thin layer of water-soluble material. Alternatively, the detackifying layer may be omitted and a removable liner substituted therefor at some additional cost and inconvenience. Reusable energy control products have been made by employing plasticized vinyl resins as the adhesive, providing a "cling" adhesion to windowpanes; see U.S. Pat. No. 4,095,013.

Other modifications of the energy control sheet material concept are shown in U.S. patent application Ser. No. 56,905, filed July 12, 1979 (now U.S. Pat. No. 4,276,910) and assigned to the assignee of the present invention; the energy control sheet material there described is directed to maintaining long wave infrared radiation, originating from inside a room, within the room, thereby enhancing its usefulness in cold climates and winter applications. The barrier layer may be applied from solution or extruded, but is typically a preformed self-supporting polymeric film adhered to the exposed aluminum surface with a thin layer of polymeric adhesive.

While all of the products just discussed have attained an extremely significant position in the marketplace, they have suffered from common problems, for which no one heretofore has provided a satisfactory solution. To some degree in any installation, and particularly where conditions are both sunny and humid, there has been a tendency for the aluminum layer to corrode to a transparent oxide form. Such corrosion may take place either locally, generating "pin holes" which gradually increase in size, or generally, causing a gradual "fading" which results in an overall loss of effectiveness of the energy control sheet material. This problem has been exacerbated by the fact that it is common to include ultraviolet light absorbers in the barrier layer in order to prevent such light from entering the interior of a room, where it has a tendency to bleach and degrade any fabrics which it strikes. For reasons which have never been adequately explained, the benzophenone ultraviolet light absorbers, which are most effective in excluding UV radiation from a room interior, tend to increase the rate at which the aluminium layer corrodes.

THE INVENTION

The present invention, which finds applicability in energy control sheet material, as well as in reflective sheeting used on highway signs, solar reflectors, etc., greatly increases the corrosion resistance of the corrodible aluminum layer, thereby prolonging the useful life of such products and greatly increasing their commercial appeal.

In its broadest aspect, then, the invention provides reflective or transparent-reflective sheet material comprising a polymeric foil backing having a thin layer of corrodible metal bonded to one face and a thin, transparent barrier layer comprising a polymeric material overlying the metal layer and bonded thereto. The contribution of the present invention lies in incorporating, in the polymeric layer which is in direct contact with the corrodible metal, a nickel organic compound, especially one of the type commonly recognized as an ultraviolet light stabilizer. It is not known why the incorporation of nickel organic compounds is so effective in improving corrosion resistance, especially since the incorporation of various known anti-oxidants has been ineffective in this regard.

DETAILED DESCRIPTION

The invention will now be described with respect to certain illustrative but non-limiting examples, in which all parts are by weight unless otherwise noted.

In each of the examples listed in Table I, biaxially oriented polyethylene terephthalate foil approximately 25 micrometers thick was coated with aluminum by conventional vapor deposition to achieve a light transmission of 16-20% as measured with a Hunter colorimeter using a broad spectrum light source (CIE Source C, which corresponds closely to typical daylight). The aluminum was then overcoated with a 25% methyl ethyl ketone solution of a soluble copolyester resin and the solvent evaporated to leave a barrier layer weighing approximately 5.4 g/m$^2$. (The copolyester resin was formed by reacting 12 parts sebacic-azelaic acid, 46 parts terephthalic acid and 12 parts isophthalic acid with 60 parts ethylene glycol and 40 parts neopentyl glycol.) Over the barrier layer was applied a 25% 1:3 ethyl acetate:isopropanol solution of a 96:4 isooctyl acrylate:acrylamide copolymer and the solvent evaporated to leave a pressure-sensitive adhesive layer weighing approximately 4.4 g/m$^2$. As is shown in Table I, the only differences among the examples reside in the composition of the barrier layer, where the amounts and types of UV absorbers, antioxidants, and nickel organic compounds are varied.

When a UV absorber is included in the barrier layer, the examples in Table I utilize a composition which is especially effective at wave lengths of 380 nanometers, as measured using a Beckman spectrophotometer. The wave length of 380 nanometers was chosen because it represents the high end of the UV range, and shorter wavelengths of light are absorbed even more efficiently. When 8% of this UV absorber is incorporated in the barrier layer, less than 2% of the 380-nanometer light is transmitted.

The ability of the various constructions to resist outdoor weathering was determined by adhering a 1.3- cm×10.2-cm sample of each construction to a glass plate and placing it in a closed chamber maintained at 52° C. and 100% relative humidity, where it was then subjected to an accelerated aging cycle consisting of 12 hours of exposure to ultraviolet light followed by 12 hours of darkness. (It has been empirically found that one week of test exposure corresponds to 3 months of outdoor exposure in Florida.) Using the Hunter colorimeter, the percent light transmission (%T) was measured initially and at various intervals after commencing the test. Corrosion of the aluminum was indicated by an increase in transmission, the percentage of increase (Δ%T) being a convenient measure; to illustrate, if the transmission were 18% initially and 24% after testing, the value of Δ%T would be 6. A 3% increase in light transmission can be visually detected, and a 10% increase renders a product commercially unacceptable.

For convenience in tabulation, the following abbreviations have been used to refer to various components in the barrier layer:

A33—Antioxidant—tris[2-(2-hydroxy-3-t-butyl-5-methyl benzyl)-4-methyl-6-t-butyl phenol] phosphate BHT—Antioxidant—butyrated hydroxy toluene N2—Nickel bis[0-ethyl(3,5-di-t-butyl-4-hydroxy benzyl)] phosphonate N4—Nickel dibutyldithio carbamate N5—Nickel bis (octylphenylsulfide)

N84—[2-2'-thiobis(4-t-octyl phenolato)]n-butylamine nickel

U490—UV absorber comprising a complex mixture of 2,2'-dihydroxy-4,4'-dimethoxy benzophenone and other tetra-substituted benzophenones.

it with hydrogen. When Example 8 was repeated, substituting this nickel-free compound for the N2 nickel compound, Δ%T was 1.6 after two weeks of testing and 7.3 after four weeks.

In selecting nickel organic compounds for use in practicing the invention, consideration should also be given to the degree of color which can be tolerated. Nickel organic compounds N2 and N84, for example, are pale yellow and hence quite inconspicuous, while compounds N4 and N5 are deep shade of, respectively, purple and green. Where absence of color is important, the amount of nickel organic salt is generally the minimum needed to secure the desired corrosion inhibition. When the concentration of nickel organic salt exceeds about 15% in the polymeric layer directly contacting the corrodible metal, some reduction in adhesion may be noted.

EXAMPLE 14

A sample of 25-micrometer biaxially oriented polyethylene terephthalate foil was vapor-coated with aluminum as in the preceding examples. A thin adhesive layer was formed by applying, over the aluminum, methyl ethyl ketone solution containing 5.5% of a first polyester resin and 0.5% of a nickel organic compound N2, and evaporating the solvent to leave a dried barrier layer weighing 0.75 g/m$^2$. (The polyester was formed by reacting 32 parts sebacic-azelaic acid, 48 parts terephthalic acid and 20 parts isophthalic acid with 60 parts ethylene glycol and 40 parts neopentyl glycol). Using heated nip rolls, a 12-micrometer barrier layer of biaxially oriented linear polypropylene foil was then laminated to the adhesive.

TABLE 1

| Example | Components Included in Barrier Coat | | | | | | Δ % T After Time Indicated | | | | | | |
|---|---|---|---|---|---|---|---|---|---|---|---|---|---|
| | UV Absorber | | Antioxidant | | Ni Organic Compound | | | | | | | | |
| | Type | % | Type | % | Type | % | 2 wks | 3 wks | 4 wks | 7 wks | 8 wks | 11 wks | 12 wks |
| Control A | — | — | — | — | — | — | 0.8 | | | | | | |
| Control B | U490 | 2 | — | — | — | — | 1.0 | | | | 9.2 | | 15.2 |
| 1 (Comparison) | " | " | BHT | 8 | — | — | 0.6 | | | | 18.1 | | |
| 2 (Comparison) | " | " | A33 | 8 | — | — | 0.3 | | | | 8.8 | | |
| 3 | — | — | — | — | N2 | 8 | 0.4 | | | | 7.3 | | |
| 4 | " | " | — | — | N4 | 8 | 0.2 | | | | 2.1 | | 3.1 |
| 5 | " | " | — | — | N5 | 8 | 0.8 | | | | 4.2 | | 5.6 |
| Control C | " | 8 | — | — | — | — | 3.9 | 14.4 | | | | | |
| 6 | " | " | — | — | N2 | 2 | 1.4 | | | | | | |
| 7 | " | " | — | — | " | 4 | 1.3 | | | | | | |
| 8 | " | " | — | — | " | 8 | 1.1 | | | | 1.3 | | 2.5 |
| 9 | " | " | — | — | " | 16 | 0.2 | | | | 2.0 | | 6.1 |
| 10 | " | " | — | — | " | 32 | 0.0 | | | | 1.9 | | 8.4 |
| 11 | " | " | — | — | N4 | 8 | 1.3 | | | 10.1 | | 42.0 | |
| 12 | " | " | — | — | N5 | 8 | 0.6 | | | 1.7 | | 3.3 | |
| 13 | " | " | — | — | N84 | 8 | 0.3 | 0.2 | | | | | |

Table I indicates that the corrosion-inhibiting effectiveness of a given nickel salt depends, in part, on the amount and nature of other components incorporated in the barrier layer. Note, for instance, Examples 4 and 11, where the effectiveness of a specific corrosion inhibitor was greatly reduced when the accompanying amount of UV absorber was increased.

Comparison Examples 1 and 2 incorporate in the barrier layer anti-oxidants which include some of the functional groups found in nickel organic compound N2; it will be noted that neither of these examples was as satisfactory as the examples containing nickel organic salts in the barrier layer. To further illustrate this point, a sample of the N2 compound was contacted with an ion exchange resin to remove the nickel ion and replace Over the polyester foil was then applied a 25% methyl ethyl ketone solution of a second polyester resin (similar to the first except that the acid starting materials were 12% sebacic-azelaic, 46% terephthalic and 42% isophthalic) containing 8% U490 based on total solids, and the solvent evaporated to leave a dried primer layer weighing 5.4 g/m$^2$. Over the primer layer was then applied a pressure-sensitive adhesive, as in the preceding examples.

The product of this Example 14 was tested for corrosion in the manner described above. A product which was identical, except for omission of the nickel organic compound (Control D), was concurrently tested. Results are tabulated below:

TABLE II

| Example | Ni Organic Compound | Δ % T After Time Indicated | | |
|---|---|---|---|---|
| | | 2 wks | 6 wks | 11 wks |
| Control D | no | 2.5 | 9.0 | 59.8 |
| 14 | yes | 3.8 | 5.5 | 8.0 |

EXAMPLE 15

The aluminized and barrier layer-protected foil of Example 8 was coated with a 1% 50:50 ethanol:toluene solution of a water-activatable adhesive and the solvent evaporated to leave a coating weighing 0.3 g/m². The adhesive was prepared by blending 90 parts of a low molecular weight interpolymer of methyl vinyl ether and maleic anhydride (specific viscosity, 1% solution in methyl ethyl ketone, 0.1-0.5) with 10 parts of a diglycidyl ether of bis-phenol A (m.p. 95°-105° C.) The adhesive was moistened, applied to a glass panel, dried and the product tested as in previous examples. Corrosion resistance, reported as Δ%T, was as follows: 2 wks, 0.4; 4 wks, 1.3.

The following examples describe the preparation of a metalized foil designed for use as a solar reflector.

EXAMPLES 16-18

A 50-micrometer co-extruded biaxially oriented polyester foil was obtained, the foil consisting of (1) a 12-micrometer polyethylene terephthalate lamina containing conventional slip agents and hence having a mildly irregular surface to facilitate winding and (2) a 38-micrometer polyethylene terephthalate lamina containing no slip agent and hence having an exposed surface which was essentially optically smooth. On the smooth surface was then vapor-deposited 80-100 nanometers of a high purity (99.98+%) aluminum to provide an opaque, specular metallic surface. Using reverse roll coating techniques, a 20% toluene solution of an acrylic polymer, believed to be a 62.4:36.2:1.4 methylmethacrylate:butyl acrylate:acrylic acid terpolymer, commercially available from Rohm & Haas under the trade designation "B-48N", was applied and the solvent evaporated by drying in a 105° C. oven for 4 minutes to leave a dry barrier layer weighing approximately 5 g/m². This product was used as a control (Control E).

Examples 16-18 were identical to the control except that 1%, 4% and 8% of the acrylic polymer, respectively, was replaced by N2 nickel organic compound.

The ability of the product to withstand outdoor exposure was then evaluated in accordance with ASTM Test No. G53-77, an accelerated weathering test in which the sample was continuously subjected to a temperature of 50° to 60° C. at relative humidity in excess of 90%, ultraviolet light (280-350 nanometers) being directed onto the coated surface at an intensity of approximately 500 watts/m² for 4-hour periods alternating with 4-hour periods of darkness. Testing was continued for 493 days, after which the light transmission of the initially opaque (0% transmission) samples was measured, using a Hunter colorimeter, as previously described. Results were as follows:

| Example | % transmission |
|---|---|
| Control E | 83.7 |
| 16 | 20.9 |
| 17 | 7.8 |
| 18 | 12.8 |

What is claimed is as follows:

1. Reflective or transparent-reflective sheet material comprising a polymeric foil backing having a thin layer of aluminum bonded to one face, a thin, transparent barrier layer comprising a polymeric material overlying the metal layer and bonded thereto, wherein a nickel organic compound which is an ultraviolet light stabilizer is included in the overlying polymeric material in direction contact with the metal layer.

2. A transparent-reflective energy control sheet material in accordance with claim 1 wherein the aluminum is vapor-deposited and the nickel organic compound is selected from the class of ultraviolet stabilizers consisting of [2,2'-thiobis(4-t-octylphenolato)]n-butylamine nickel; nickel-bis(octylphenyl sulfide); nickel [0-ethyl(3,5-di-t-butyl-4-hydroxybenzyl)] phosphonate; nickel dialkyldithio carbamate; nickel bis(3,5-di-t-butyl-4-hydroxy benzoate); and the nickel chelate of octoxybenzophenone.

3. The sheet material of claim 2 wherein the overlying polymeric material also contains an ultraviolet light absorber.

4. The sheet material of claim 3 wherein the ultraviolet light absorber is a benzophenone.

5. The sheet material of claim 4 wherein the nickel organic compound is selected from the class of nickel organic salts consisting of nickel bis[0-ethyl(3,5-di-t-butyl-4-hydroxy benzyl)] phosphonate and [2-2'-thiobis(4-t-octyl-phenolato)]n-butylamine nickel.

6. The energy control sheet material of claim 2 wherein the barrier layer comprises a self-supporting polymeric foil.

7. The energy control sheet material of claim 6 wherein the self-supporting polymeric foil is biaxially oriented polypropylene.

8. The energy control sheet material of claim 2 wherein, to facilitate mounting the sheet material on a windowpane, an overlying layer of adhesive is bonded to the barrier layer.

9. The energy control sheet material of claim 2 wherein the overlying polymeric layer contains 1-15% nickel organic compound.

* * * * *